(12) United States Patent
Binder et al.

(10) Patent No.: US 12,435,763 B2
(45) Date of Patent: Oct. 7, 2025

(54) ELECTROMAGNETIC CLUTCH AND METHOD OF ACTUATING AN ELECTROMAGNETIC CLUTCH

(71) Applicant: Hoerbiger Antriebstechnik Holding GmbH, Schongau (DE)

(72) Inventors: Juergen Binder, Schongau (DE); Peter Echtler, Schongau (DE); Andreas Dempfle, Schongau (DE); Werner Fuerguth, Schongau (DE); Wolfgang Voelk, Schongau (DE); Oleg Butorin, Schongau (DE); Sebastian Kucharek, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 18/919,724

(22) Filed: Oct. 18, 2024

(65) Prior Publication Data

US 2025/0129824 A1 Apr. 24, 2025

(30) Foreign Application Priority Data

Oct. 19, 2023 (DE) .......................... 102023128799.0

(51) Int. Cl.
*F16D 27/11* (2006.01)
*F16D 11/14* (2006.01)
(Continued)

(52) U.S. Cl.
CPC ............ *F16D 27/118* (2013.01); *F16D 11/14* (2013.01); *F16D 27/108* (2013.01); *F16D 2011/006* (2013.01)

(58) Field of Classification Search
CPC ........ F16D 27/118; F16D 27/09; F16D 27/02; F16D 27/14; F16D 27/108; F16D 2011/006; F16D 2011/002; F16D 11/14
See application file for complete search history.

(56) References Cited

U.S. PATENT DOCUMENTS

| 11,802,597 | B1 * | 10/2023 | Bangar | ................ F16D 48/064 |
| 2015/0000442 | A1 * | 1/2015 | Kimes | ................... F16H 63/304 |
| | | | | 192/84.1 |

(Continued)

FOREIGN PATENT DOCUMENTS

DE 102004013450 A1 9/2005

*Primary Examiner* — Farhana Pervin
(74) *Attorney, Agent, or Firm* — McNees Wallace & Nurick LLC

(57) ABSTRACT

An electromagnetic clutch is specified, includes a shifting sleeve which is arranged on a shaft for joint rotation therewith and is linearly displaceable along the shaft between a first engaged position, a second engaged position and a disengaged position located between the engaged positions, a first clutch body and a second clutch body, which are axially spaced apart from each other and are each aligned coaxially with the shaft, each clutch body having an internal toothing, and a stator having a first and a second energizable coil. The shifting sleeve has a first toothing for engaging the internal toothing of the first clutch body in the first engaged position and a second toothing for engaging the internal toothing of the second clutch body in the second engaged position. The clutch furthermore includes a locking device which prevents the shifting sleeve from moving beyond the disengaged position in the direction of the further engaged position when the shifting sleeve is displaced out of an engaged position in the direction of the disengaged position. A method of actuating the clutch is also specified.

20 Claims, 13 Drawing Sheets

(51) Int. Cl.
*F16D 27/108* (2006.01)
*F16D 27/118* (2006.01)
*F16D 11/00* (2006.01)

(56) References Cited

U.S. PATENT DOCUMENTS

| | | | |
|---|---|---|---|
| 2016/0178017 A1* | 6/2016 | Bauer | F16D 23/0606 |
| | | | 228/199 |
| 2016/0265601 A1* | 9/2016 | Mastie | F16D 27/118 |
| 2017/0363158 A1* | 12/2017 | Goossens | B60K 17/02 |
| 2018/0112721 A1* | 4/2018 | Koelzer | F16D 23/025 |
| 2020/0063806 A1* | 2/2020 | Ekonen | F16D 27/108 |
| 2021/0190150 A1 | 6/2021 | Trinkenschuh et al. | |
| 2023/0135670 A1* | 5/2023 | Binder | F16H 61/0403 |
| | | | 74/339 |
| 2024/0352979 A1 | 10/2024 | Binder et al. | |

\* cited by examiner

ELECTROMAGNETIC CLUTCH AND METHOD OF ACTUATING AN ELECTROMAGNETIC CLUTCH

TECHNICAL FIELD

The present disclosure relates to an electromagnetic clutch and to a method of actuating an electromagnetic clutch.

BACKGROUND

The term "electromagnetic clutch" is intended to refer to the fact that the clutch is actuated electromagnetically. However, the torque may be transmitted in a form-fitting and/or frictional manner when the clutch is closed. In other words, the clutch is shifted by a combination of magnetic forces and mechanical forces.

Clutches are typically used if torque is to be temporarily transmitted from one shaft to another shaft aligned coaxially therewith without these two shafts being permanently connected. A distinction is made here between frictional and positive clutches. The present disclosure is limited to positive clutches.

For positive clutches, sliding shifting sleeves are often used. These have one or more different toothings, which engage with counter toothings, creating a positive engagement via which torque can be transmitted from one shaft to another.

Electromagnetic clutches are known from the prior art, in which the shifting sleeve is adjusted by means of a coil which exerts a magnetic force on the shifting sleeve. In such clutches, the shifting sleeve can be moved in opposite directions from a disengaged position to engage the shifting sleeve with different, axially spaced clutch bodies.

In the case of the prior art clutches, overshoot of the shifting sleeve may occur during disengagement when the shifting sleeve is moved back from an engaged position to the disengaged position. This means that the shifting sleeve moves beyond the disengaged position, so that the shifting sleeve may unintentionally engage with the opposite clutch body, torque being thus transmitted for a short time.

Therefore, the present disclosure is to specify an improved electromagnetic clutch in which overshooting of the shifting sleeve is easily prevented.

SUMMARY

According to the present disclosure, an object is achieved by an electromagnetic clutch, comprising a shifting sleeve which is arranged on a shaft for joint rotation therewith and is linearly displaceable along the shaft between a first engaged position, a second engaged position and a disengaged position located between the engaged positions, a first clutch body and a second clutch body, which are axially spaced apart from each other and are each aligned coaxially with the shaft, each clutch body having an internal toothing, and a stator having a first and a second energizable coil for direct or indirect adjustment of the shifting sleeve along the shaft. The shifting sleeve has a first toothing for engaging the internal toothing of the first clutch body in the first engaged position and a second toothing for engaging the internal toothing of the second clutch body in the second engaged position. Furthermore, the electromagnetic clutch comprises a locking means which prevents the shifting sleeve from moving beyond the disengaged position in the direction of the further engaged position when the shifting sleeve is displaced out of an engaged position in the direction of the disengaged position.

The locking means prevents the shifting sleeve from overshooting beyond the disengaged position when disengaging, thus ensuring that the shifting sleeve does not engage with the further clutch body.

In the engaged position, there is, for example, a positive engagement between the shifting sleeve and one of the two clutch bodies.

When the shifting sleeve is in the disengaged position, no torque is transmitted. The disengaged position thus represents a neutral position.

The locking means includes, for example, a locking element which is a bolt which can be radially displaced between a release position and a locking position. Such a locking element is easy to implement and thus cost-effective, while at the same time reliably blocking movement of the shifting sleeve.

For example, the locking element mechanically prevents the shifting sleeve from overshooting, so that no elaborate position control is required.

By blocking the shifting sleeve with a mechanical stop, short shifting times are possible. In other words, the control for engaging and disengaging is simplified.

For example, the electromagnetic clutch includes a plurality of circumferentially distributed locking elements. This allows the individual locking elements to be designed smaller than they would be if there were only one locking element, resulting in an overall compact design of the electromagnetic clutch.

The locking element is acted upon into the release position by means of an elastic element, for example. This ensures that a displacement of the shifting sleeve is not unintentionally blocked. In addition, the locking element can be moved back into the release position without energy expenditure.

The locking element can be moved against the spring force of the elastic element into the locking position when the shifting sleeve moves from the disengaged position to an engaged position. The locking element is thus already in the locking position when the shifting sleeve is in the engaged position, so that during a subsequent disengaging process, the locking element reliably blocks any movement beyond the disengaged position.

For example, the locking element is mounted in the shifting sleeve so as to be radially displaceable. Consequently, when the clutch is actuated, the locking element moves together with the shifting sleeve in one direction along the shaft. This makes it possible to lock the shifting sleeve in a position other than the disengaged position.

A recess is for example present in the shifting sleeve through which the locking element extends.

The shifting sleeve can be divided in the center and the two parts of the shifting sleeve are fastened axially to each other by a connecting ring, the locking element being guided in the connecting ring in a radially displaceable manner. The connecting ring thus has a dual function as a fixing element and as a guiding element. In this way, a compact design of the clutch is achieved. Because the shifting sleeve is divided in the center, it can be produced cost-effectively, since the individual components have a smaller volume.

The two parts of the shifting sleeve can be identical.

According to one embodiment, the clutch includes an armature coupled to the shifting sleeve, the armature being displaceable along the first shaft by energizing the first or the second coil of the stator. The displacement of the shifting sleeve by the coils is thus performed indirectly by means of the armature. This allows the material of the shifting sleeve to be selected independently of the magnetic properties thereof. More specifically, the torque-transmitting components may be hardened, for example, without having to take the magnetic properties of the shifting sleeve into account. The torque-transmitting parts may be magnetically decoupled from the armature.

The armature may be designed in several parts and, for example, have a magnetic core and a plastic driving element firmly connected to the core. This also contributes to a cost-effective production of the clutch.

The armature is for example detachably coupled to the shifting sleeve in the direction of movement by means of the locking element. In this case, detachably coupled means that a relative movement is possible between the armature and the shifting sleeve in the direction along the shaft, in particular that the armature can be displaced to a limited extent relative to the shifting sleeve. The detachable coupling gives the shifting sleeve greater freedom of movement, allowing the shifting sleeve to overlap with the clutch bodies to a particularly large extent.

The armature may be coupled to the shifting sleeve via two elastic spring elements which rest against opposite axial surfaces of the armature and each rest against the shifting sleeve with an end facing away from the armature. The armature is clamped in the shifting sleeve for example by the spring elements. The spring elements produce a restoring force on the armature, so that after a displacement of the shifting sleeve relative to the armature, during which one of the spring elements is compressed, it can be restored to a center position by the elastic force of the compressed spring element.

In connection with this embodiment, the two-part production of the shifting sleeve also has a positive effect. For example, the armature and the spring elements can be inserted into the shifting sleeve before the parts of the shifting sleeve are connected to each other by means of the connecting ring.

The spring element is, for example, a disk spring or a wave ring or a pack of these elements.

A driving geometry may be present on the armature for the positive coupling of the armature with the locking element, the driving geometry having a step or a bevel which is configured such that the locking element moves out of the release position into the locking position or vice versa by a movement along the step or the bevel when the shifting sleeve is displaced relative to the armature. The movement of the locking element is therefore effected mechanically by the geometry of the armature, so that no additional drive is required to adjust the locking element, which contributes to a compact and cost-effective design of the clutch.

When moving from the release position into the locking position, the locking element can move out of the driving geometry or remain in the driving geometry.

Due to the positive coupling of the armature to the locking element, the armature is also coupled by means of the locking element to the shifting sleeve, in which the locking element is radially mounted.

A guiding surface is for example present on the outer side of the first shaft, a locking tooth being arranged centrally on the guiding surface, against which the locking element abuts when moving from the engaged position into the disengaged position. A mechanical stop is realized in a simple manner by means of such a locking tooth.

The locking element has, for example, a tooth-shaped tip at the end directed towards the shaft.

According to one embodiment, the clutch comprises a holding means which is set up to hold the shifting sleeve in the disengaged position or in the engaged position in the de-energized state of the coils. The clutch can therefore be operated in a particularly energy-efficient manner, since a magnetically effective shifting force is required only for actively displacing the shifting sleeve. In other words, the holding means prevents unintentional displacement without actuation of the armature.

The holding means is, for example, a mechanical holding means.

For example, the holding means has at least one holding element which is mounted in the shaft and elastically acted upon against the shifting sleeve, and the shifting sleeve has three axially spaced recesses in the area of the holding element, the holding element projecting at least in sections into a corresponding recess in an engaged position or the disengaged position of the shifting sleeve. The at least one holding element thus secures the shifting sleeve against unintentional displacement, while movement of the shifting sleeve is possible without hindrance when a force greater than the holding force of the holding element is applied to the shifting sleeve in the direction of movement.

The holding element is, for example, a ball which rests against the shifting sleeve and is acted upon against the shifting sleeve by means of a spring element.

At least one of the recesses may have a triangular contour when viewed in a longitudinal section through the shifting sleeve. Such a contour makes it possible for the holding element to exert a restoring force on the shifting sleeve as soon as the holding element is arranged in the recess. Alternatively, a semicircular contour of the recess is also possible.

According to one embodiment, the locking means may comprise a control unit which is set up to regulate an energization of the first coil and the second coil such that when the shifting sleeve is displaced from an engaged position in the direction of the disengaged position, a movement of the shifting sleeve beyond the disengaged position in the direction of the further engaged position is prevented. In this way, a position of the shifting sleeve can be adjusted purely by means of the magnetic forces of the two coils. The mechanical locking surfaces can be dispensed with. The locking element may also be present in this embodiment, but in this case it serves only to couple the armature to the shifting sleeve and has no locking function.

The object is further achieved by a method of actuating an electromagnetic clutch according to the disclosure. In a first method step, while the shifting sleeve is in a disengaged position, the first or the second coil is energized, causing the shifting sleeve to be moved in the direction of the corresponding engaged position. During the movement of the shifting sleeve from the disengaged position into an engaged position, for example at the latest when the engaged position is reached, the locking element is moved in the radial direction out of a release position into a locking position. During a subsequent movement of the shifting sleeve out of the engaged position in the direction of the disengaged position by energizing the further coil, the locking element blocks a movement of the shifting sleeve into the disengaged position.

As already explained in connection with the clutch according to the disclosure, this prevents the shifting sleeve from moving beyond the disengaged position during disengagement.

The movement of the shifting sleeve is for example caused, on the one hand, by a magnetic force generated by the coils and, on the other hand, by a torque. As soon as the shifting sleeve overlaps a clutch body, the torque acting on the shifting sleeve generates a force in the direction of displacement, as a result of which a greater overlap with the clutch body is achieved. More specifically, the combination of a magnetic and a mechanical shifting force makes it possible to achieve a greater shifting travel, thus improving the torque capacity of the clutch.

The locking element can be moved to a release position by a re-energization of the first or second coil energized to move the shifting sleeve into the engaged position, allowing the shifting sleeve to return into the disengaged position. The fact that a current pulse is required to release the lock ensures that the locking element cannot inadvertently move back into the release position, making the lock particularly reliable.

In an alternative embodiment, after energization of the further coil, the energization is stopped, causing the armature to move back into its initial position, and the locking element being able to move back into the release position. This means that when disengaging, as long as the coil is energized to move the armature or the shifting sleeve, the locking element remains in the locking position, initially preventing the shifting sleeve from moving into the disengaged position. As soon as energization is stopped, the locking element can move back into the release position and the shifting sleeve can move back into the disengaged position without the need for a further current pulse.

If the electromagnetic clutch comprises a holding means as described above, the shifting sleeve can be reset to the disengaged position by the holding means, e.g. by the holding element pressing against an inclined surface of the recess, which is triangular in a longitudinal section, of the shifting sleeve when it is acted upon. This also contributes to an energy-efficient operation of the electromagnetic clutch.

A movement of the locking element from the locking position into the release position occurs, for example, when the shifting sleeve moves into the disengaged position.

Alternatively, the locking element may be moved from the locking position into the release position before the shifting sleeve is moved into the disengaged position.

The object is further achieved by a method of actuating an electromagnetic clutch according to the disclosure, which comprises a control unit. While the shifting sleeve is in a disengaged position, the first or the second coil is energized, causing the shifting sleeve to be moved in the direction of the corresponding engaged position. During a subsequent movement of the shifting sleeve out of the engaged position in the direction of the disengaged position, the control unit regulates an energization of the first coil and the second coil such that when the shifting sleeve is displaced from an engaged position in the direction of the disengaged position, a movement of the shifting sleeve beyond the disengaged position in the direction of the further engaged position is prevented. No mechanical locking elements are required to carry out such a method.

DETAILED DESCRIPTION

Figure 1:
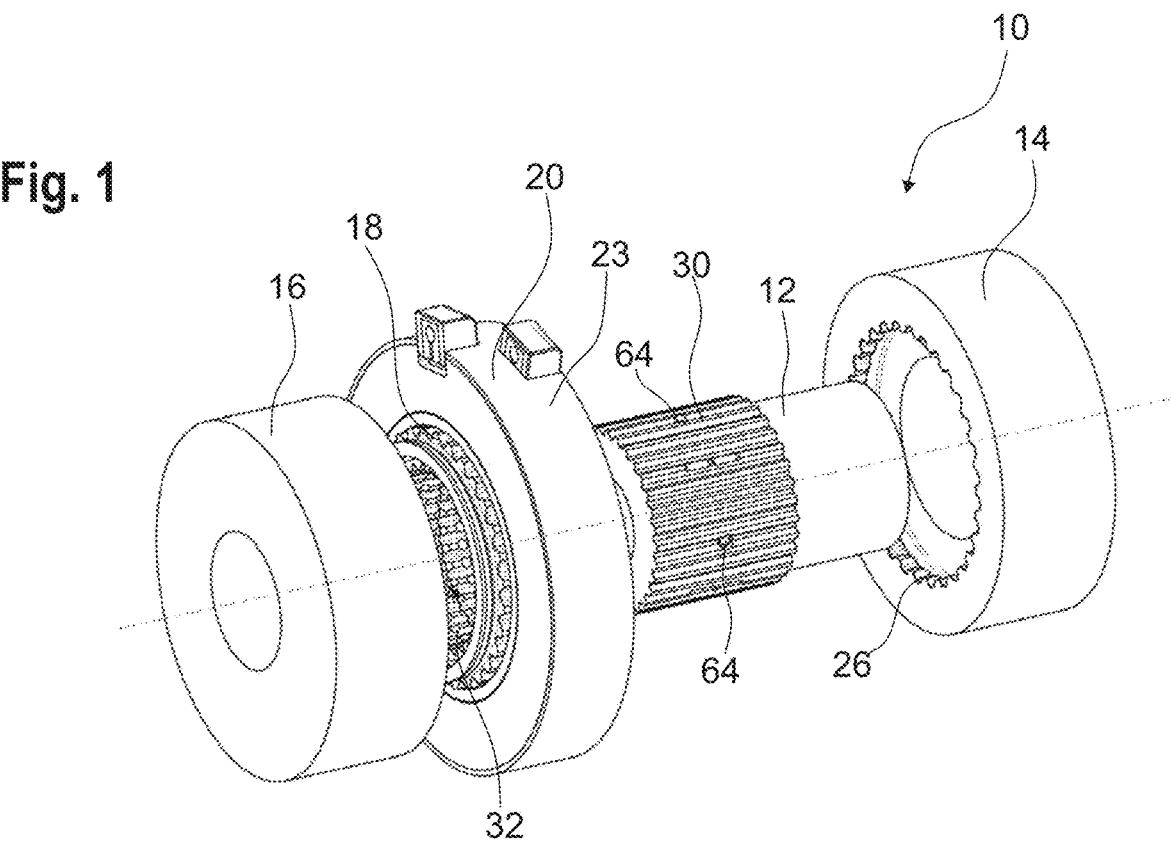
FIG. 1 shows an electromagnetic clutch according to the disclosure in an exploded view.

FIG. 1 shows an electromagnetic clutch 10.

The clutch 10 includes a shaft 12, a first clutch body 14, a second clutch body 16, a shifting sleeve 18 and a stator 20.

Figure 4:
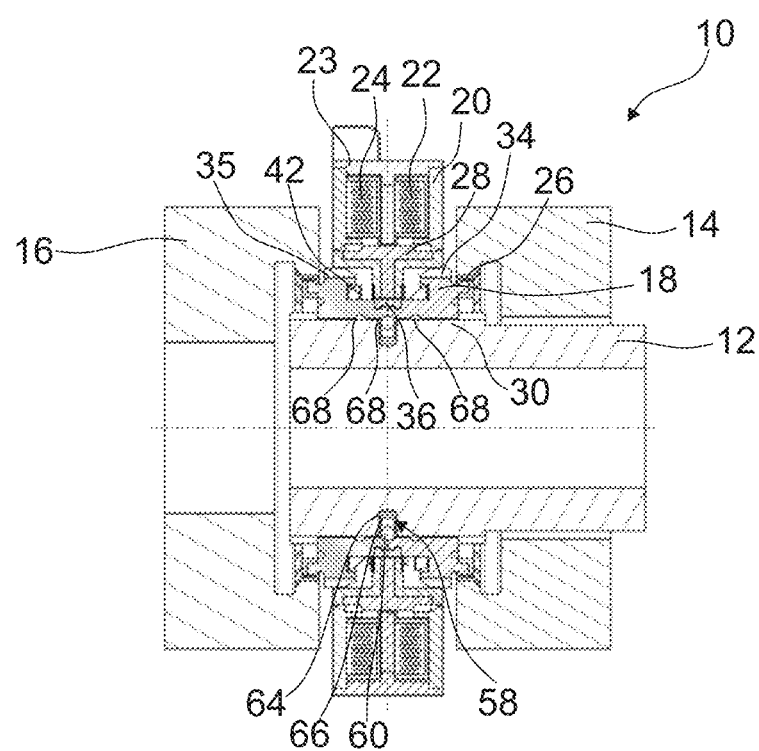
FIG. 4 shows a longitudinal section through the clutch of FIG. 1 in the area of a holding means in a neutral position of the clutch.

The stator 20 houses a first energizable coil 22 and a second energizable coil 24, which can be seen in FIG. 4. In addition, the stator 20 comprises a steel body 23, which together with the coils 22, 24 forms an electromagnet.

A shifting force can be generated by energizing the coils 22, 24.

The clutch bodies 14, 16 are axially spaced apart and each aligned coaxially with the shaft 12. This is illustrated by the sectional views in FIGS. 4 to 9.

Each clutch body 14, 16 has an internal toothing 26.

The shifting sleeve 18 is arranged on the shaft 12 for joint rotation therewith and is linearly displaceable along the shaft 12 between a first engaged position, a second engaged position and a disengaged position located between the engaged positions. The various positions will be explained in more detail below.

In the example embodiment, the displacement of the shifting sleeve 18 is performed indirectly by means of an armature 28, which can be seen in FIGS. 2 to 10. The armature 28 can be displaced axially by energizing the coils 22, 24. For example, a force is generated on the armature 28 by the magnetic field produced when energizing one or both coils 22, 24.

However, it is also conceivable that the shifting sleeve 18 can be displaced directly by energizing the coils 22, 24.

In the example embodiment, the shaft 12 has an external toothing 30 which engages with an internal toothing 32 of the shifting sleeve 18.

At its opposite ends, the shifting sleeve 18 respectively has a first toothing 34 and a second toothing 35, which are each formed as an external toothing. It serves for torque-transmitting engagement with the internal toothing 26 of the clutch bodies 14, 16, to transmit a torque between the shifting sleeve 18 and the clutch bodies 14, 16 when the shifting sleeve 18 is in an engaged position.

The first toothing 34 and the second toothing 35 are in particular dog toothings.

Figure 2:
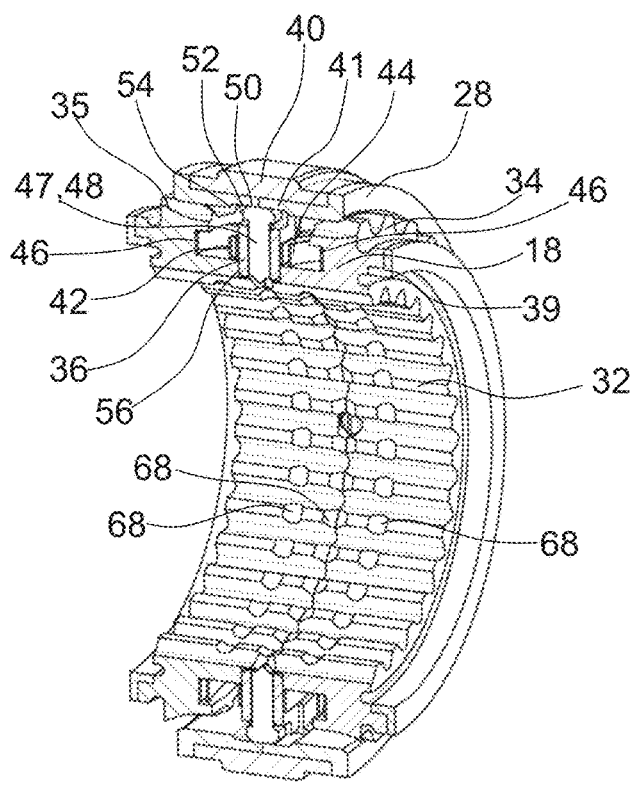
FIG. 2 shows a perspective sectional view through a shifting sleeve and an armature of the electromagnetic clutch of FIG. 1.
Figure 3:
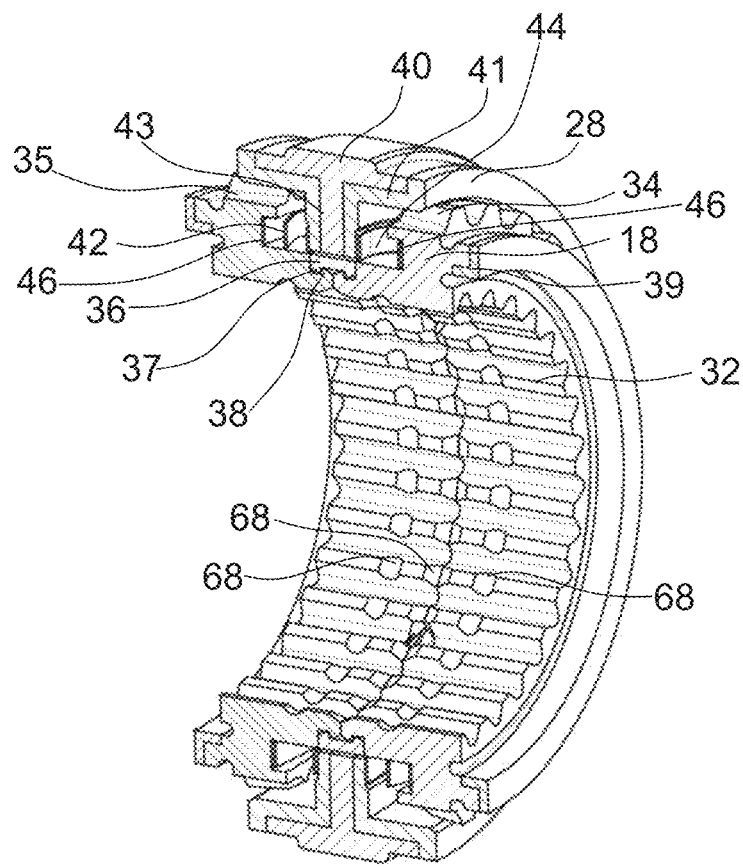
FIG. 3 shows a further perspective sectional view through the shifting sleeve and the armature of the electromagnetic clutch of FIG. 2.

The toothings 32, 34, 35 of the shifting sleeve 18 can be seen more clearly in FIGS. 2 and 3, which each show a perspective sectional view of the shifting sleeve 18 with the armature 28.

The shifting sleeve 18 and the armature 28 and the coupling thereof are described in detail below with reference to FIGS. 2 and 3.

In the example embodiment, the shifting sleeve 18 is designed in two parts. The shifting sleeve 18 can be divided in the center, the two parts of the shifting sleeve 18 being identical.

The two parts of the shifting sleeve 18 are axially fastened to each other by a connecting ring 36 (see FIG. 3). The connecting ring 36 is also visible in FIG. 10, which shows a cross-section through the clutch 10.

The connecting ring 36 and the parts of the shifting sleeve 18 may have latching lugs 37, 38, by means of which the connecting ring 36 is held in engagement with the parts of the shifting sleeve 18.

A ring-shaped shielding element 39 is arranged at each axial end of the shifting sleeve 18, which ensures that the shifting sleeve 18 does not adhere magnetically to the clutch bodies 14, 16. The shielding elements 39 can be made of stainless steel or a plastic material.

The armature 28 is also designed in several parts and has a ferromagnetic core 40, which is surrounded, at least in sections, by a sheath 41. The sheath 41 is made, for example, of plastic and serves as a magnetic barrier to the other clutch components.

Viewed in cross-section, the armature 28 is designed in sections, e.g. in a T-shape. In other words, the armature 28 has a web 43 extending towards the shifting sleeve 18 (see FIG. 3).

Figure 10:
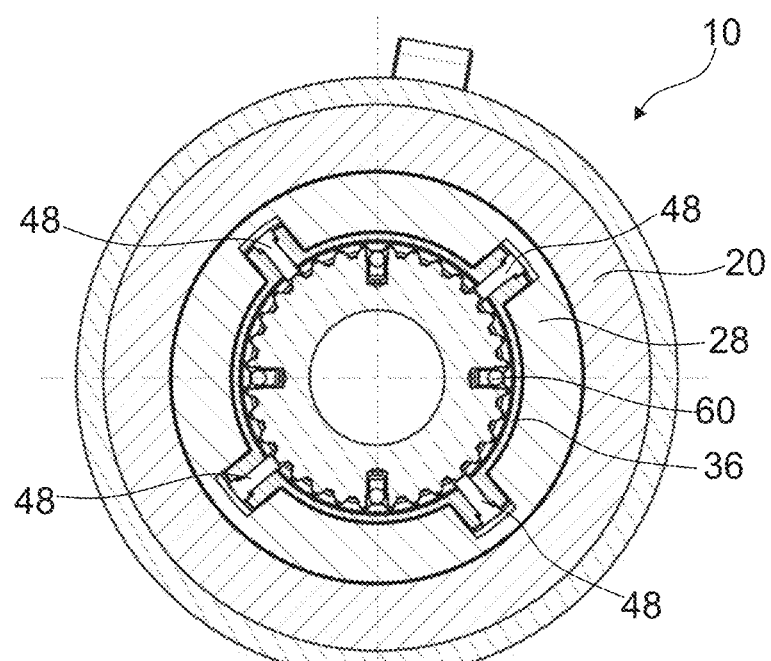
FIG. 10 shows a cross-section through the clutch of FIG. 1, FIG. 11 schematically shows a sectional view in the area of the holding means.

Viewed as a whole, the armature 28 is ring-shaped, as can be seen in FIG. 10.

The armature 28 is guided on the toothings 34, 35 of the shifting sleeve 18.

The armature 28 is coupled to the shifting sleeve 18 via two elastic spring elements 42.

The spring elements 42 rest on opposite axial surfaces of the armature 28, more precisely on opposite surfaces of the web 43.

With one end facing away from the armature 28, the spring elements 42 each rest on the shifting sleeve 18.

Thus, the armature 28 is coupled to the shifting sleeve 18 in the axial direction, a relative movement in the axial direction being possible between the armature 28 and the shifting sleeve 18 by compression of the spring elements 42. In other words, the armature 28 is detachably coupled to the shifting sleeve 18.

In the example embodiment, the spring elements 42 are formed by a pack of wave springs.

To enable a relative movement of the armature 28 relative to the shifting sleeve 18, the shifting sleeve 18 has a circumferential recess 44, see FIG. 3, the web 43 of the armature 28 extending into the recess 44.

A circumferential groove 46 is provided on each of the axial end faces of the recess 44 and serves to position the spring elements 42. More specifically, the spring elements 42 are each arranged in sections in a groove 46, so that the spring elements 42, in the assembled state of the shifting sleeve 18, are secured thereon against slipping out.

As shown, for example, in the sectional view in FIG. 2, the clutch 10 has a locking means 47 including a plurality of locking elements 48, which in the example embodiment are designed as bolts.

Four circumferentially distributed locking elements 48 are for example provided (see also FIG. 10).

The purpose of the locking element 48 is to block, to mechanically block, a movement of the shifting sleeve 18 beyond a disengaged position when the shifting sleeve 18 is displaced from an engaged position in the direction of the disengaged position, which will be described in more detail below on the basis of the description of the operating principle of the clutch 10.

Figure 8:
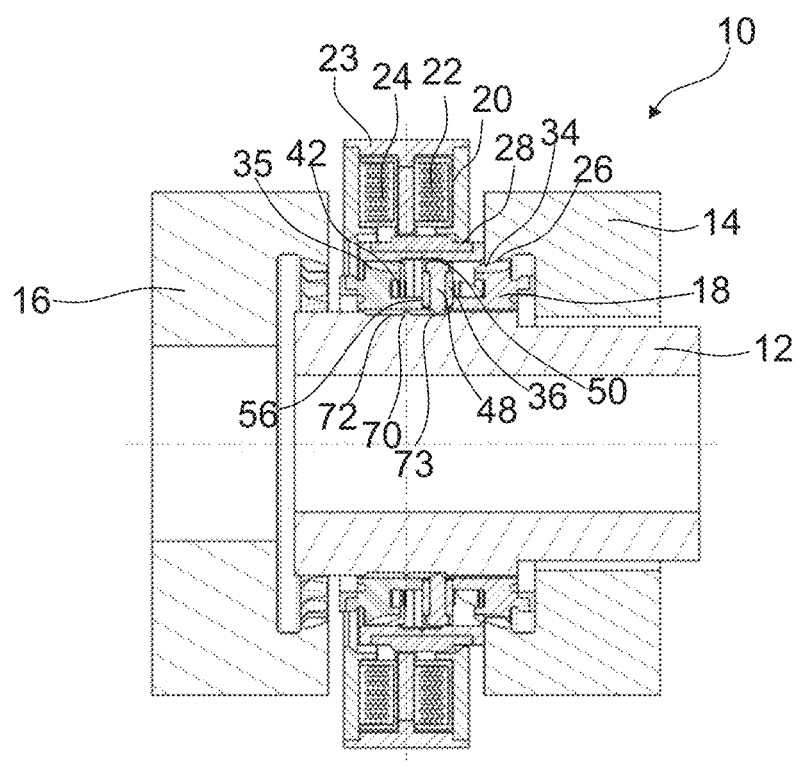
FIG. 8 shows a longitudinal section through the clutch of FIG. 1 in the area of the locking element in an engaged state.
Figure 9:
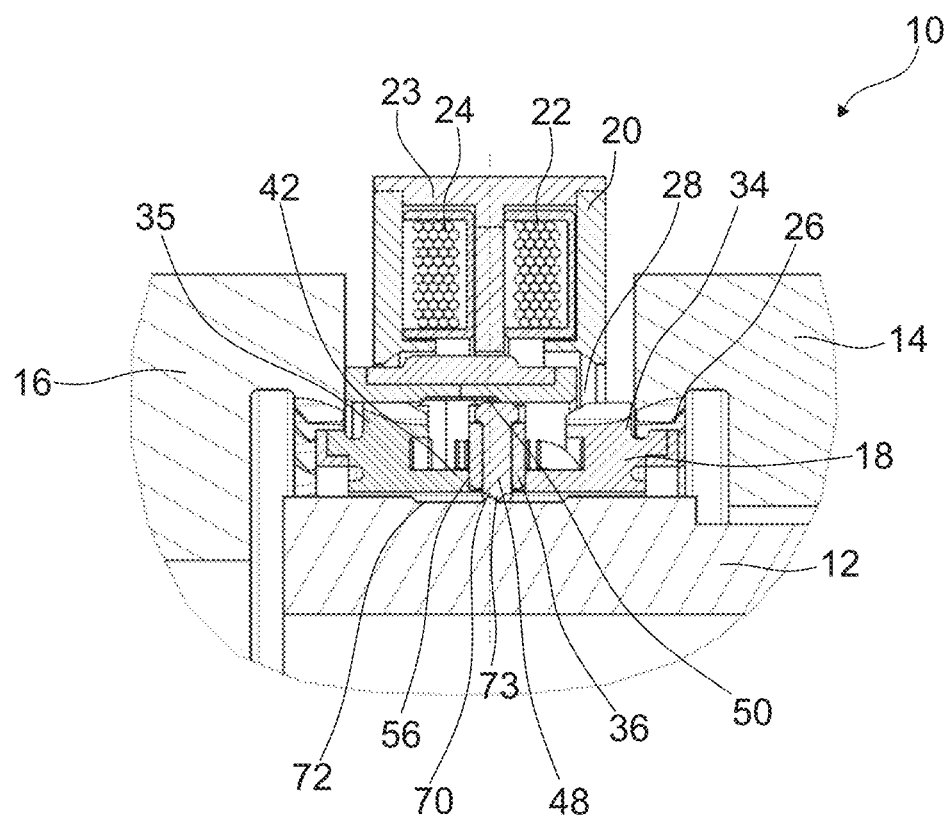
FIG. 9 shows a longitudinal section through the clutch of FIG. 1 in the area of the locking element during a disengaging process.

For this purpose, the locking element 48 can be radially displaced between a release position (see FIGS. 2 and 5) and a locking position (see FIGS. 8 and 9).

A driving geometry 50 for the positive coupling of the armature 28 with the locking element 48 is present on the armature 28 (see FIGS. 2 and 5 to 9).

In the example embodiment, the driving geometry 50 is a recess 52 on an inner side of the armature 28, the locking element 48 being arranged with one end in the recess 52 in the release position, as shown in FIG. 2.

In the example embodiment, the driving geometry 50 has a bevel 54.

The locking elements 48 are displaceably guided in the shifting sleeve 18, more precisely in the connecting ring 36.

Corresponding recesses 56 are provided in the shifting sleeve 18, through which the locking element 48 can extend, e.g. when the locking element 48 is moved into the locking position.

In the sectional view in FIG. 4, it can be seen that the clutch 10 further comprises a holding means 58.

The holding means 58 is designed to hold the shifting sleeve 18 in the disengaged position or in the engaged position when the coils 22, 24 are in the de-energized state.

For this purpose, the holding means 58 comprises a plurality of holding elements 60 which are mounted in the shaft 12 and are elastically acted upon against the shifting sleeve 18.

In the example embodiment, the holding elements 60 are balls, each of which is arranged in a radial recess 64 in the shaft 12 and projects partially out of the latter when the shifting sleeve 18 is in an engaged position or in the disengaged position.

The holding elements 60 are each acted upon in the direction of the shifting sleeve 18 by means of a spring element 66.

The shifting sleeve 18 has three axially spaced recesses 68 in the area of the holding elements 60.

In an engaged position or the disengaged position of the shifting sleeve 18, the holding elements 60 project at least in sections into a corresponding recess 68.

As the shifting sleeve 18 moves from the disengaged position to an engaged position, the holding elements 60 are pushed further into the recesses 64 in the shaft 12 against the spring force, thus allowing axial movement of the shifting sleeve 18.

The holding elements 60 are arranged circumferentially offset to the locking elements 48, as can be seen in FIG. 10.

One of the recesses 68, e.g. the center recess 68, in which the holding element 60 engages in the disengaged position of the shifting sleeve 18, has a triangular contour when viewed in a longitudinal section through the shifting sleeve 18.

An operating principle of the clutch 10, in particular a method of actuating the electromagnetic clutch 10 will be described below with reference to FIGS. 4 to 9.

Figure 5:
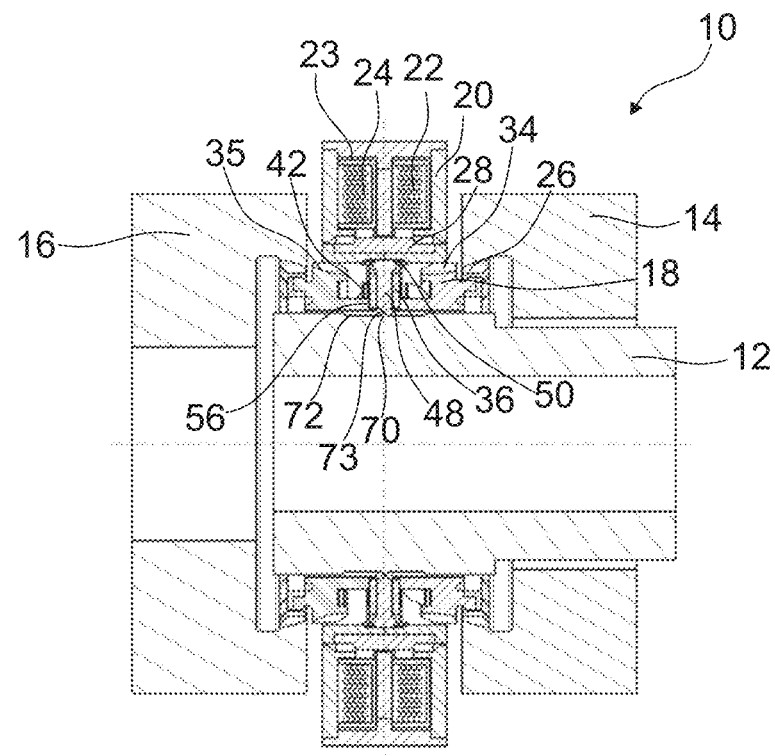
FIG. 5 shows a longitudinal section through the clutch of FIG. 1 in the area of the locking element in a neutral position of the clutch.

FIGS. 4 and 5 each show the clutch 10 in a neutral position, in which the shifting sleeve 18 is in the disengaged position.

The locking element 48 is in a release position, the locking element 48 being in particular arranged centrally above a locking tooth 70.

The locking tooth 70 is arranged in the center of a guiding surface 72, which is present on the outer side of the shaft 12.

The height of the locking tooth 70 is chosen such that the locking element 48 can move over the locking tooth 70 when it is in its release position and moves axially, and abuts against the locking tooth 70 when it is in its locking position and moves axially.

The locking element 48 has, for example, a tooth-shaped tip 73 at its end directed towards the shaft 12. In other words, the locking element 48 has a flat in the direction of the locking tooth 70.

The guiding surface 72 is formed e.g. by a longitudinal tooth of the shaft 12 being partially removed, for example by milling.

In the neutral position, the armature 28 is located centrally above the shifting sleeve 18 and centrally between the clutch bodies 14, 16.

Figure 6:
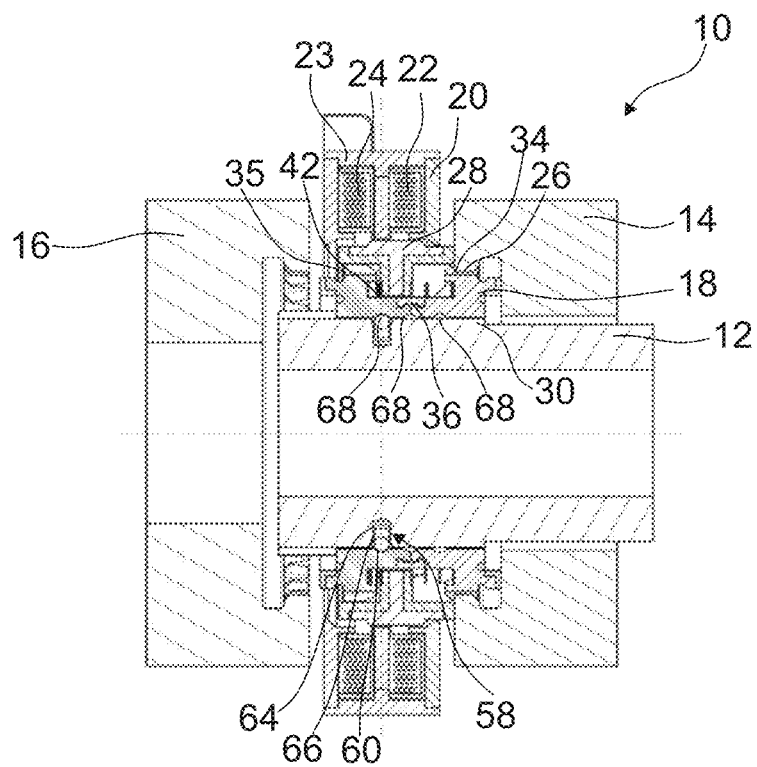
FIG. 6 shows a longitudinal section through the clutch of FIG. 1 in the area of a holding means in an engaged state.

If the clutch 10 is shifted, for example by energizing the first coil 22, a magnetic force is exerted on the armature 28, which as a result is displaced, in the example embodiment to the right (see FIG. 6).

The clutch body 14 serves as a stop to limit a displacement path of the armature 28.

The displacement of the armature 28 causes the shifting sleeve 18 to be displaced accordingly, so that the toothing 34 of the shifting sleeve 18 comes into engagement with the internal toothing 26 of the clutch body 14.

The displacement is achieved, on the one hand, by a magnetic force acting on the armature 28 and, on the other hand, by a torque acting on the shifting sleeve 18.

Figure 7:
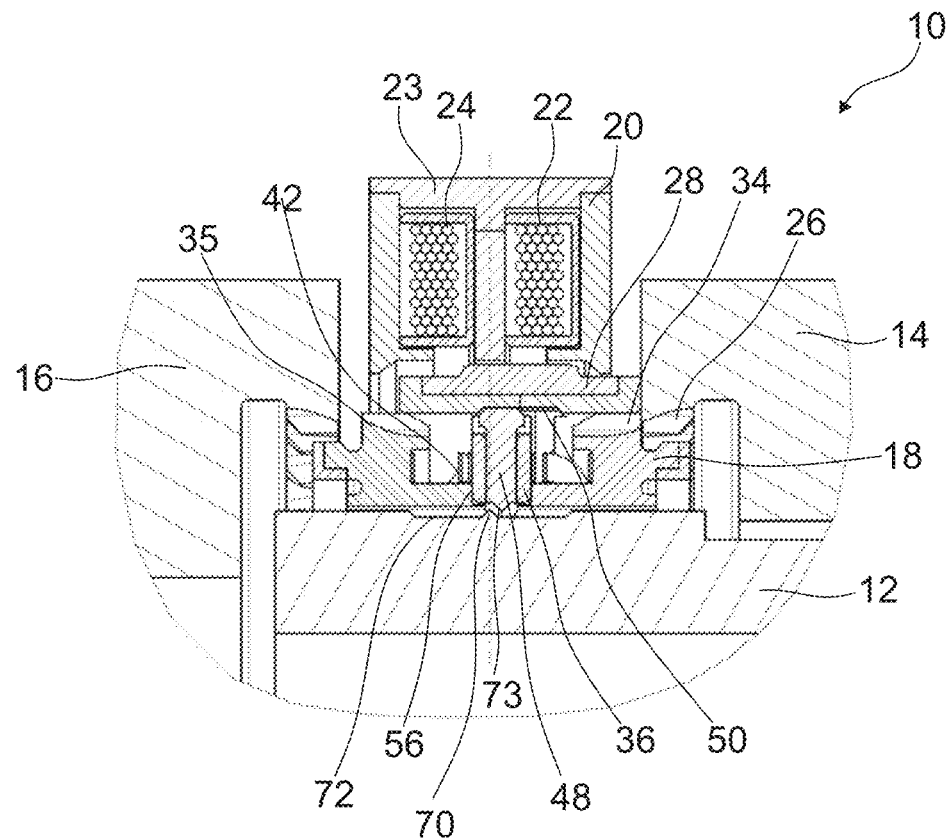
FIG. 7 shows a longitudinal section through the clutch of FIG. 1 in the area of the locking element during an engaging process.

FIG. 7 illustrates the displacement of the shifting sleeve 18 caused by the magnetic force, immediately before the toothing 34 of the shifting sleeve 18 overlaps the internal toothing 26 of the clutch body 14. The condition shown in FIG. 7 can occur first, in which the shifting sleeve 18 abuts with its toothing 34 against an end face of the clutch body 14, until the alignment of the internal toothing 26 of the clutch body 14 and the toothing 34 of the shifting sleeve 18 allows engagement and the shifting sleeve 18 is moved into engagement with the internal toothing 26 of the clutch body 14 due to the energy stored in the spring element 42.

As soon as the shifting sleeve 18 overlaps with the clutch body 14 due to the displacement of the armature 28, the shifting sleeve 18 is further attracted towards the clutch body 14 due to the shape of the internal toothing 26 of the clutch body 14 and the toothing 34 of the shifting sleeve 18, until the shifting sleeve 18 abuts against the clutch body 14, as can be seen in FIGS. 6 and 8.

More specifically, this is achieved by the internal toothing 26 of the clutch bodies 14, 16 and the toothing 34 of the shifting sleeve 18 having undercuts in the direction of the engaged position, which are designed such that a torque transmission between the shaft 12 or the shifting sleeve 18 and a clutch body 14, 16 generates a force on the shifting sleeve 18 in the direction of the engaged position.

The displacement path of the shifting sleeve 18 in the direction of the engaged position is limited by the shifting sleeve 18 abutting against the clutch body 14.

As can be seen in FIG. 6, one of the spring elements 42 is compressed, e.g. the spring element 42 which is further away from the clutch body 14 with which the shifting sleeve 18 is engaged.

The holding element 60 moves into the corresponding recess 68 of the shifting sleeve 18, causing an additional holding force to act on the shifting sleeve 18.

When the shifting sleeve 18 moves from the disengaged position to the engaged position shown in FIG. 6, the locking element 48 is moved into the locking position.

As shown in FIG. 5, the locking element 48 is initially in the release position when the shifting sleeve 18 is in a disengaged position.

One end of the locking element 48 facing away from the shaft 12 engages with the driving geometry 50.

If the armature 28 is displaced by energizing the coil 22 and the shifting sleeve 18 is thus displaced by the coupling with the armature 28 via the spring elements 42, the locking element 48 moves with the shifting sleeve 18 due to the mounting of the locking element 48 in the shifting sleeve 18, the state shown in FIG. 7 being initially reached.

The locking element 48 initially remains in the release position, as shown in FIG. 7.

If the shifting sleeve 18 moves further in the direction of the engaged position due to the force caused by the torque, the locking element 48 is pulled out of the driving geometry 50 by the movement of the shifting sleeve 18, since a further movement of the armature 28 is blocked due to the stop on the clutch body 14.

In this movement, the locking element 48 moves out of the recess 52 and slides along the bevel 54, as a result of which the locking element 48 is pressed down and thus reaches the locking position, as shown in FIG. 8.

The armature 28 can remain in the shown position during the engaged state.

The shifting sleeve 18 is still held in the engaged position, e.g. by the torque and by the holding means 58.

To open the clutch 10, the armature 28 is again moved in a disengaging direction by energizing the second coil 24, e.g. until the armature 28 abuts against the opposite clutch body 16, as illustrated in FIG. 9.

The shifting sleeve 18 moves out of the engaged position along with the armature 28.

However, the shifting sleeve 18 is prevented from returning to the disengaged position because the locking element 48 is still in the locking position.

More specifically, the locking element 48 abuts against the locking tooth 70.

In this way, the shifting sleeve 18 is first decelerated during a disengaging process, so that unwanted overshooting of the shifting sleeve 18 beyond the disengaged position is reliably prevented.

To move the shifting sleeve 18 back to the disengaged position, the energization of the coil 24 is stopped, so that both coils 22, 24 are de-energized and the armature 28 can return to its initial position. The displacement of the armature 28 is carried out by the elastic energy stored in the spring elements 42.

When the armature 28 is displaced to its initial position, the recess 52 of the driving geometry 50 is located above the locking element 48 so that the latter can move back into the release position.

Specifically, the holding means 58 returns the shifting sleeve 18 to the disengaged position, more precisely in that the holding element 60 presses against an inclined surface of the recess 68 of the shifting sleeve 18, which is triangular in a longitudinal section, when it is acted upon. This is illustrated by the schematic diagram in FIG. 11.

As the locking element 48 is no longer held in the locking position, the locking element 48 slides along the locking tooth 70 when the shifting sleeve 18 moves and is pushed back into the release position.

The clutch 10 is then in its initial state again.

The shifting sleeve 18 can be brought into engagement with the clutch body 16 in the same way. To this end, the armature 28 is deflected in the opposite direction by energizing the respective other coil 22, 24.

The mechanical locking function makes it possible to move the armature 28 up to its end positions by an appropriate energization of the coils 22, 24 for each shifting operation, as a result of which short shifting times are possible. In particular, no complex position control is required.

Furthermore, the position of the armature 28 can be used to indirectly determine the position of the shifting sleeve 18.

A further embodiment of the clutch 10 is described with reference to FIGS. 12 to 24.

The clutch 10 illustrated in FIGS. 12 to 24 differs from the clutch 10 described above substantially in the mounting of the locking element 48.

The same reference numerals will be used below for identical structures having identical functions that are known from the above embodiment, and in this respect, reference is made to the above explanations, the differences between the respective embodiments being discussed below to avoid repetition.

Like in the previously described embodiment, the locking element 48 is designed as a radially displaceable bolt which is guided in the connecting ring 36.

Figure 12:
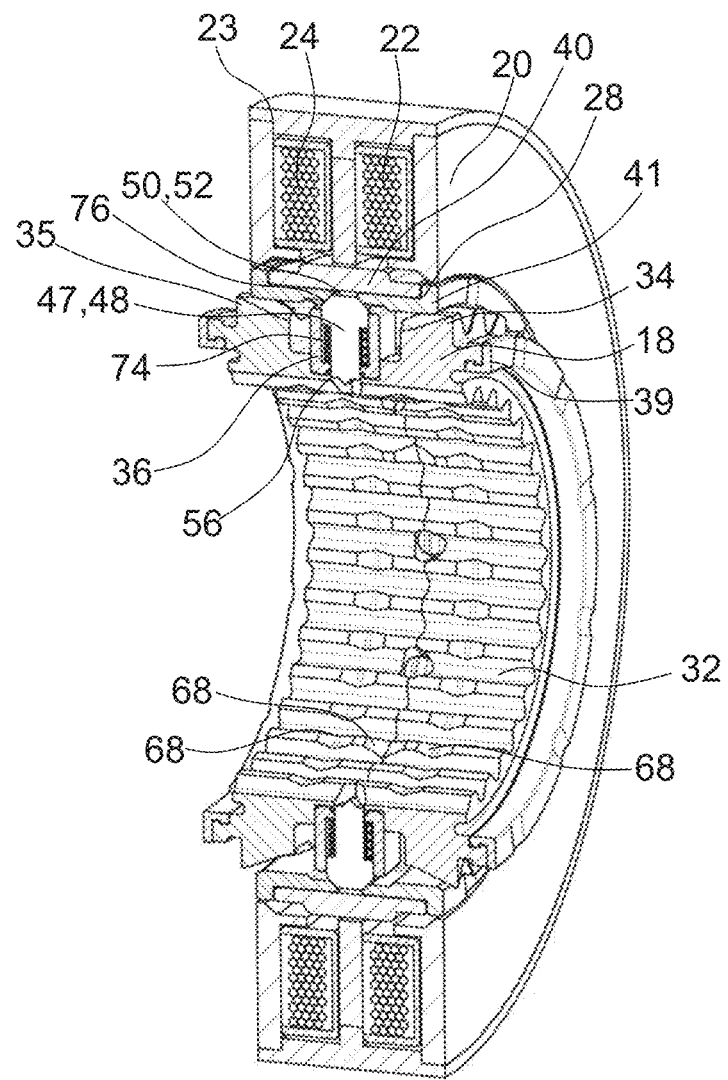
FIG. 12 shows a perspective sectional view through a shifting sleeve, a stator and an armature of an electromagnetic clutch according to a further embodiment according to the disclosure.
Figure 15:
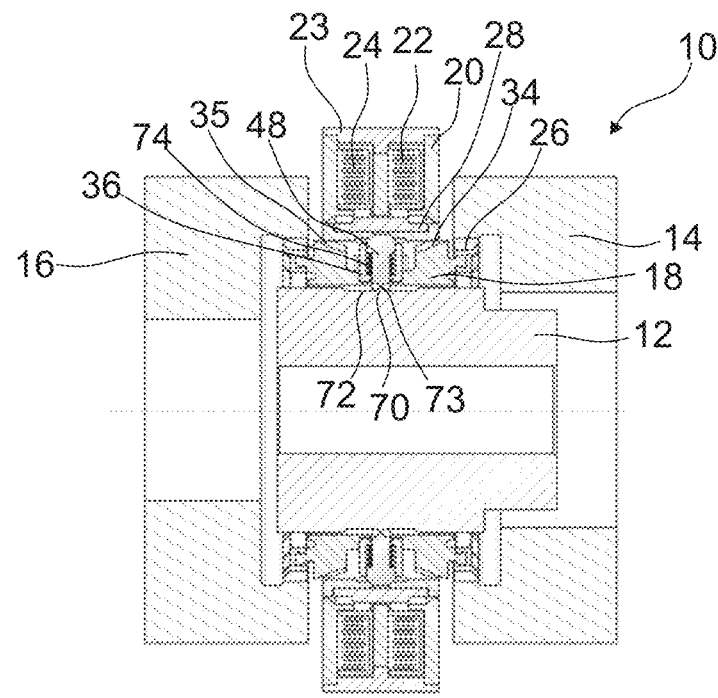
FIG. 15 shows a longitudinal section through the clutch of FIG. 13 in the area of a locking element in a neutral position of the clutch.
Figure 18:
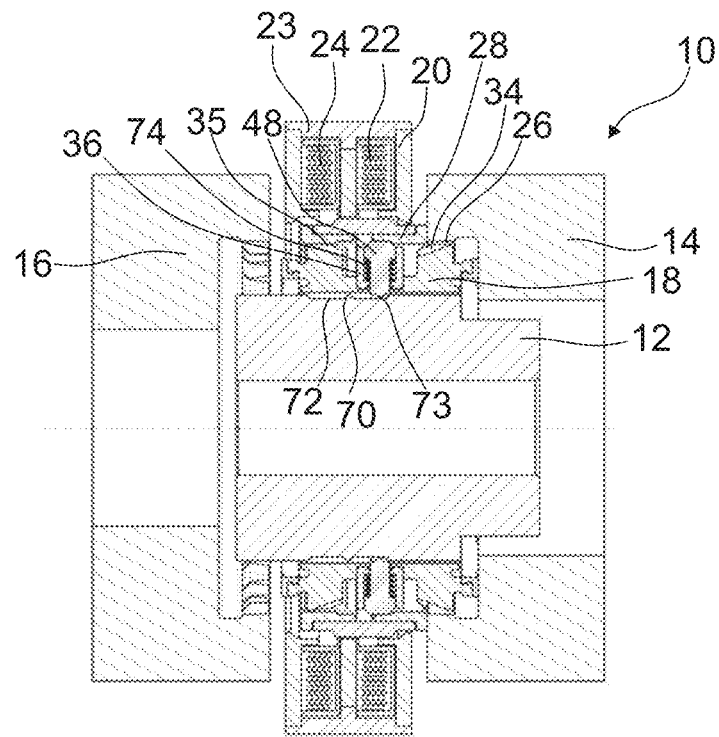
FIG. 18 shows a longitudinal section through the clutch of FIG. 13 in the area of the locking element in an engaged state.
Figure 19:
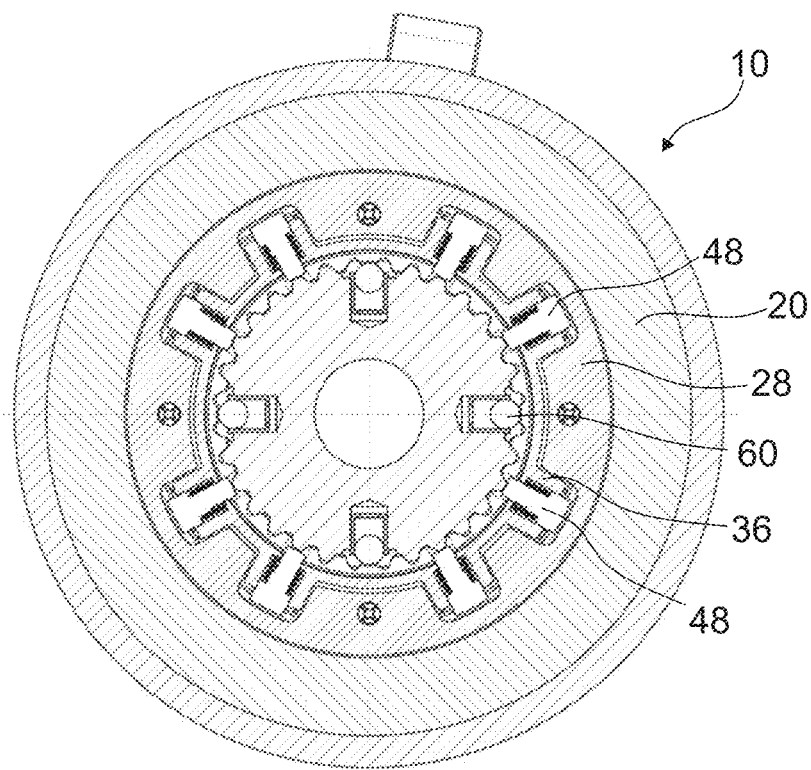
FIG. 19 shows a cross-section through the clutch of FIG. 13.

However, in contrast to the previously described embodiment, the locking element 48 is acted upon into the release position by means of an elastic element 74, which in the example embodiment is a spring, as can be seen in FIGS. 12, 15 and 18.

Figure 14:
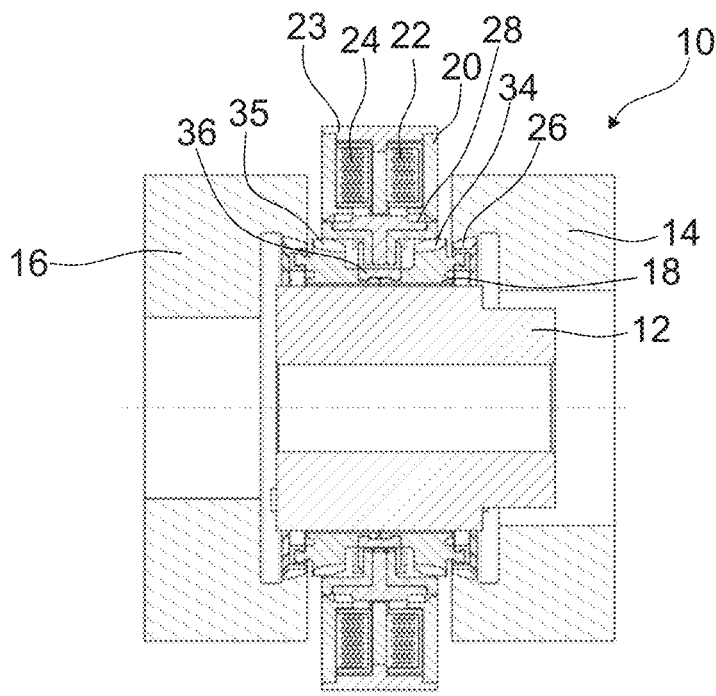
FIG. 14 shows a longitudinal section through the clutch of FIG. 13 in the area of a connecting ring in a neutral position of the clutch.
Figure 17:
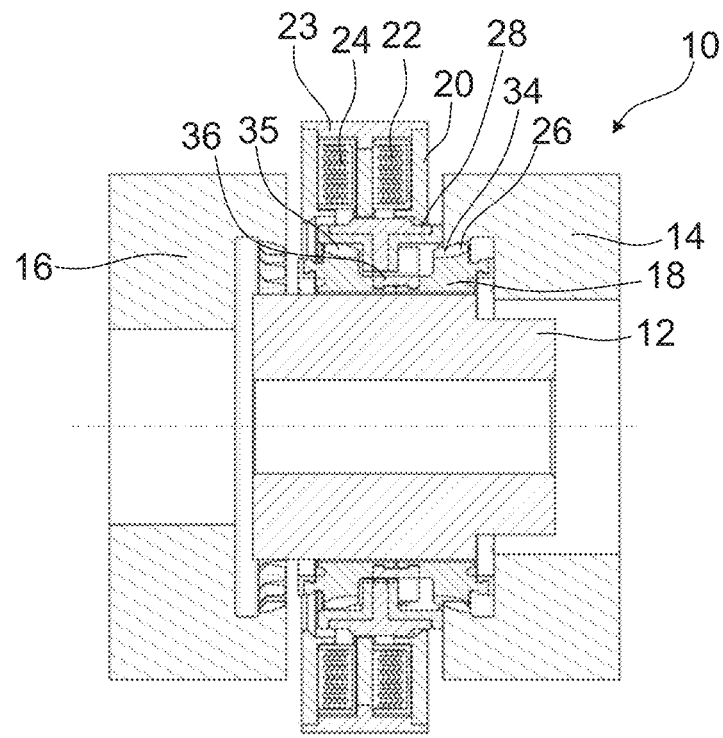
FIG. 17 shows a longitudinal section through the clutch of FIG. 13 in the area of the connecting ring in an engaged state.

The spring elements 42 for coupling the armature 28 to the shifting sleeve 18 are omitted in this embodiment, as can be seen in particular in FIGS. 14 and 17, which show a longitudinal section through the clutch 10 in the area between the locking element 48 and the holding means 58.

Instead, the armature 28 is coupled to the shifting sleeve 18 via the locking element 48, as explained below.

A driving geometry 50 having a recess 52 is also provided on the armature 28, the driving geometry 50 having a step 76 on both sides. As a result, the recess 52 is deeper in a central area than in the lateral areas.

In the central area, the contour of the recess 52 is for example adapted to the contour of the locking element 48.

In the neutral state of the clutch 10, i.e. when the shifting sleeve 18 is in the disengaged position, the elastic element 74 acts on the locking element 48 towards the central, deeper area of the driving geometry 50 or the recess 52, the armature 28 being thus detachably coupled to the shifting sleeve 18.

The locking element 48 can be coupled to the armature 28 in a force- and form-fitting manner. As a result, the locking element 48 is also displaced when the armature 28 moves, e.g. as long as the locking element 48 is in the release position.

In the embodiment according to FIGS. 12 to 19, there are a total of six locking elements 48 (see FIGS. 8 and 19), which are distributed around the circumference, wherein the locking elements 48 do not necessarily have to be evenly spaced in the circumferential direction.

The holding means 58 is basically identical to that in the previously described embodiment.

Figure 13:
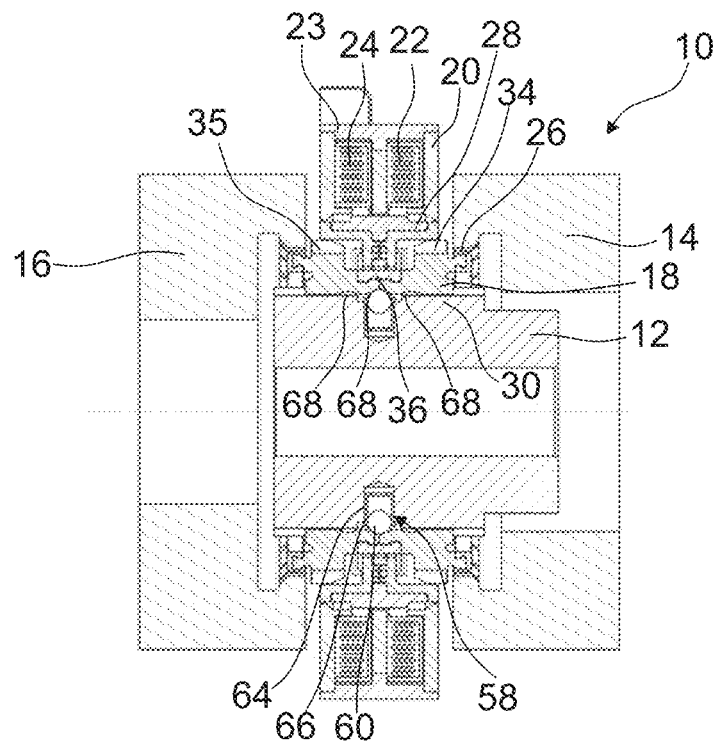
FIG. 13 shows a longitudinal section through a clutch according to the disclosure with the shifting sleeve, the stator and the armature of FIG. 12 in the area of a holding means in a neutral position of the clutch.
Figure 16:
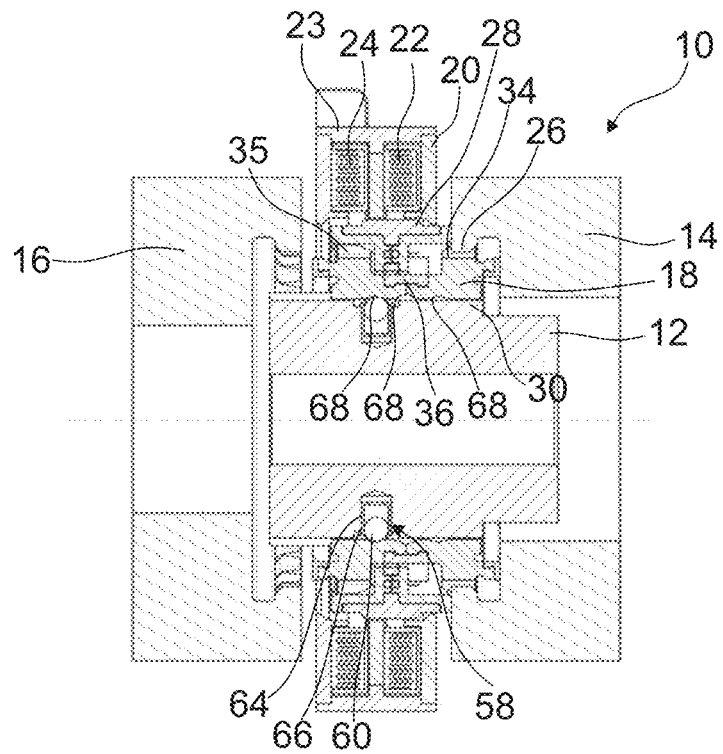
FIG. 16 shows a longitudinal section through the clutch of FIG. 13 in the area of the holding means in an engaged state.

However, all recesses 68 in the shifting sleeve 18 have a triangular cross-section, as can be seen in FIGS. 13 and 16, whereas in the previously described embodiment, the two outer recesses 68 have a semicircular cross-section.

The actuation of the clutch 10 according to FIGS. 12 to 19 differs only slightly from the actuation of the clutch 10 according to FIGS. 1 to 11.

The actuation of the clutch 10 is described below with reference to FIGS. 20 to 24.

Figure 20:
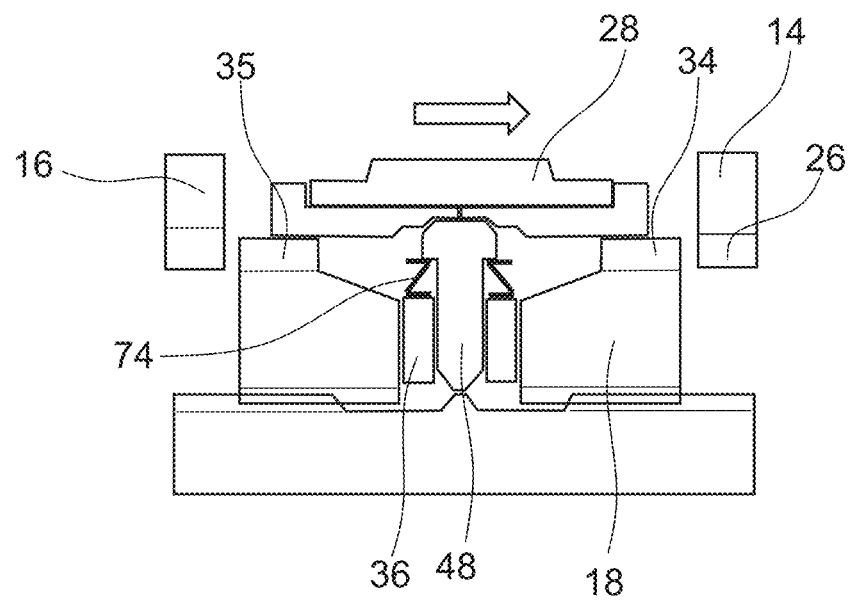
FIG. 20 shows a schematic sectional view of the clutch of FIG. 13 in a neutral position.

FIG. 20 shows the clutch 10 in a neutral state. The armature 28 and the shifting sleeve 18 are in a center position or in the disengaged position.

When the first coil 22 is energized, the armature 28 is displaced, as illustrated in FIG. 20 by the arrow pointing to the right, the shifting sleeve 18 being displaced together with the armature 28 due to the coupling of the armature 28 to the locking element 48.

Figure 21:
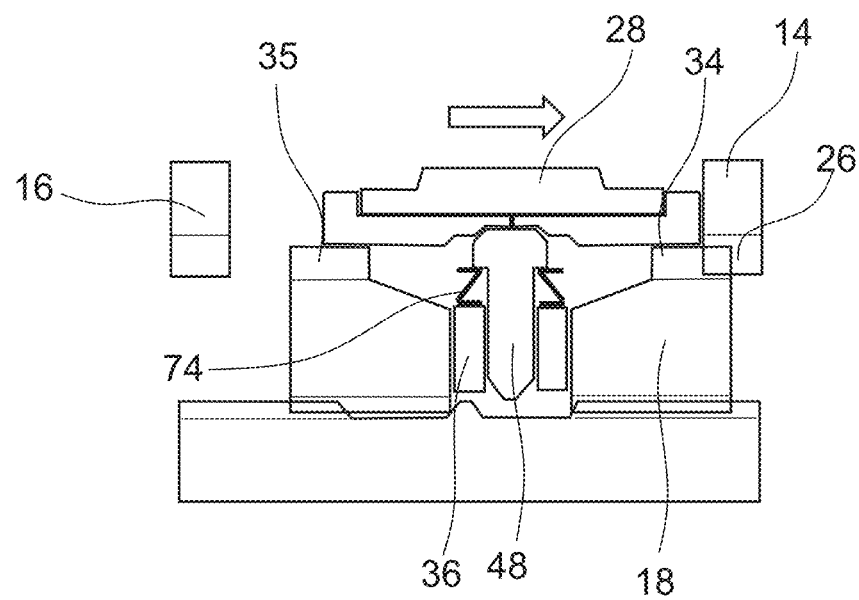
FIG. 21 shows a schematic sectional view of the clutch of FIG. 13 in an engaged state.

In FIG. 21, the shifting sleeve 18 is shown in a position which can be achieved by a purely magnetic force.

The armature 28 already abuts against the clutch body 14, so that further displacement of the armature 28 in the engagement direction is not possible.

However, there is already a certain overlap of the toothing 34 of the shifting sleeve 18 with the internal toothing 26 of the clutch body 14.

Figure 22:
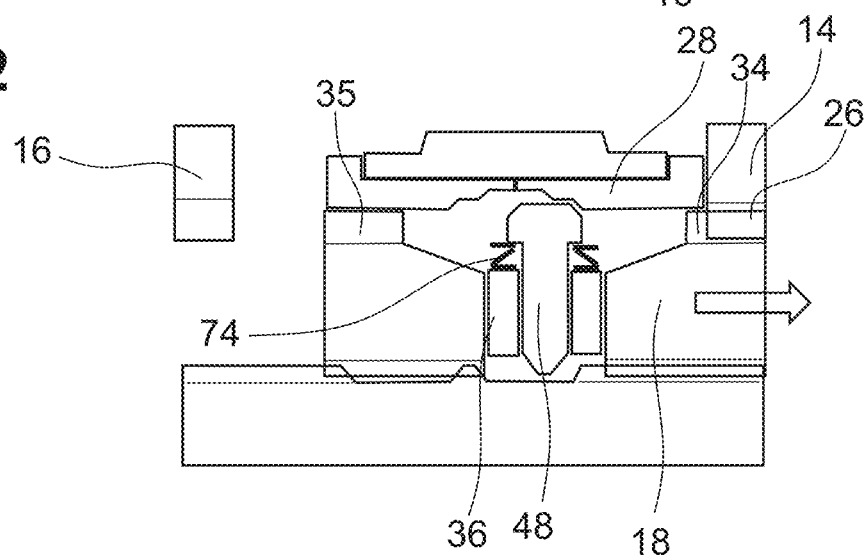
FIG. 22 shows a schematic sectional view of the clutch of FIG. 13 in an engaged state.

As already explained in connection with the previously described embodiment, the shifting sleeve 18 is pulled further in the direction of the engaged position due to the special shape of the toothing with undercuts in the direction of the engaged position and the acting torque, until the position shown in FIG. 22 is reached.

During this movement of the shifting sleeve 18, the locking element 48 is pulled out of the central area of the driving geometry 50, the locking element 48 being pressed over the step downwards into the locking position against the spring force of the elastic element 74. This is caused by the fact that a further movement of the armature 28 is blocked by a resting on the clutch body 14, while the shifting sleeve 18 can continue to move and is thus displaced relative to the armature 18.

The shifting sleeve 18 and the armature 28 are held by the holding means 58 in the position shown in FIG. 22 as long as the coils 22, 24 are de-energized.

Figure 23:
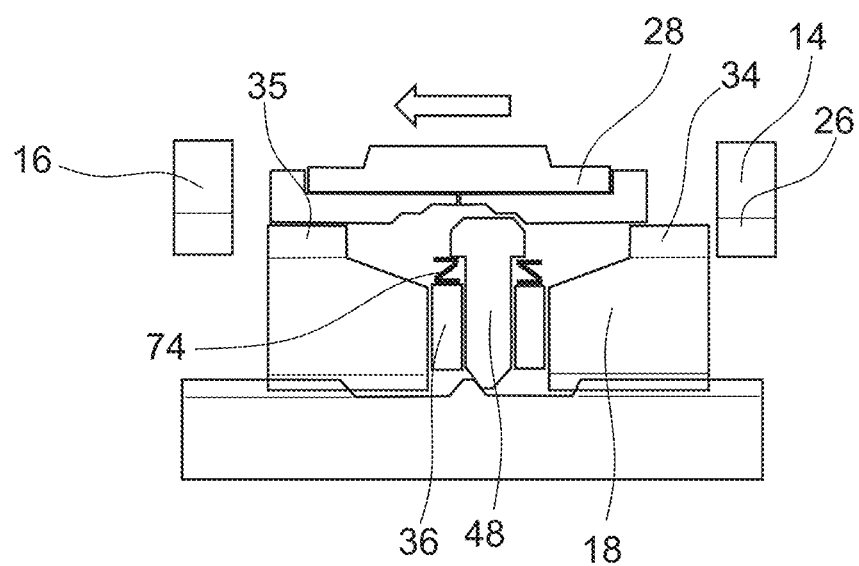
FIG. 23 shows a schematic sectional view of the clutch of FIG. 13 during a disengaging process.
Figure 24:
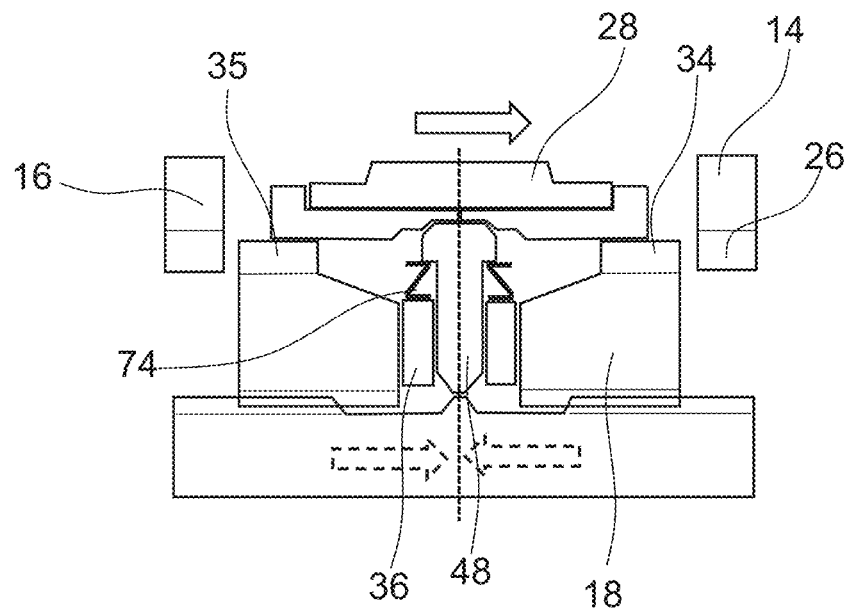
FIG. 24 shows a schematic sectional view of the clutch of FIG. 13 in a disengaged state.

The disengagement is carried out in the same way as in the previously described embodiment by energizing the further coil 24, the locking element 48 abutting against the locking tooth 70 and initially blocking a return of the shifting sleeve 18 into the disengaged position (see FIG. 23).

The armature 28 cannot come to rest against the opposite clutch body 16 as the armature 28 is held back by the driving geometry 50 on the locking element 48.

To enable the shifting sleeve 18 to return to the disengaged position, the armature 28 is moved to the right again by briefly energizing the first coil 22 until the central area of the driving geometry 50 is located above the locking element 48, so that the locking element 48 can move into the release position due to the spring force.

Figure 11:
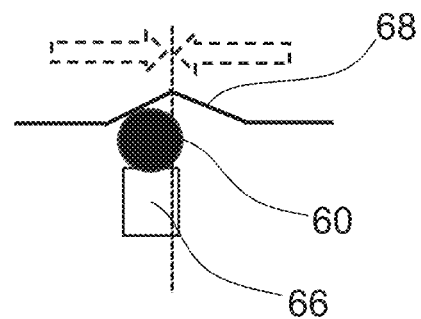

Resetting to the disengaged position from the position shown in FIG. 23 is performed, as already illustrated in FIG. 11, by the holding means 58, e.g. by the holding elements 60 each pressing against the inclined surface of the triangular recesses 68.

Figure 25:
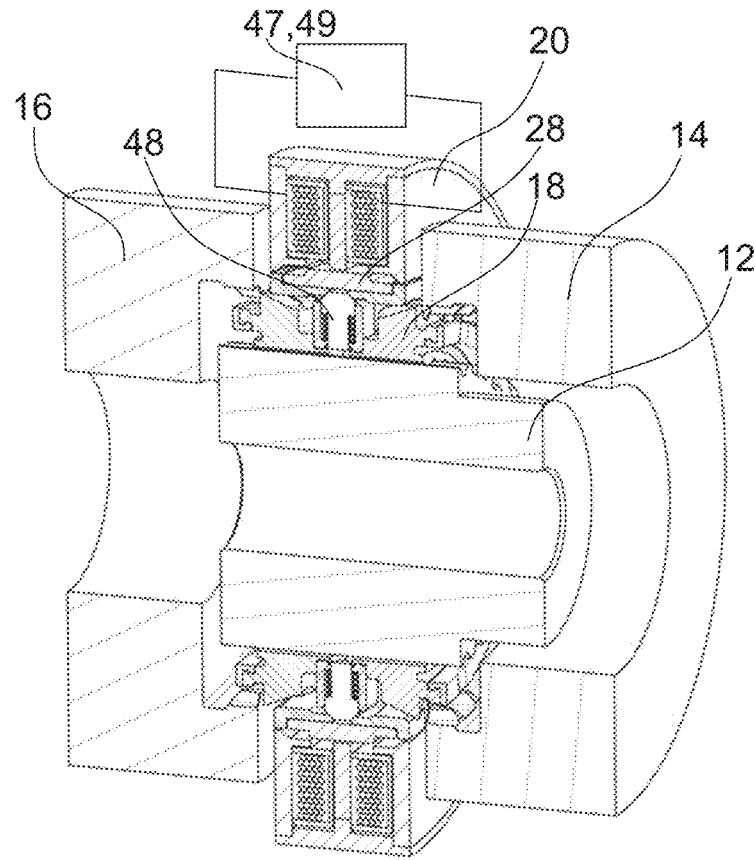
FIG. 25 shows a perspective sectional view of an electromagnetic clutch according to a further embodiment according to the disclosure.
Figure 26:
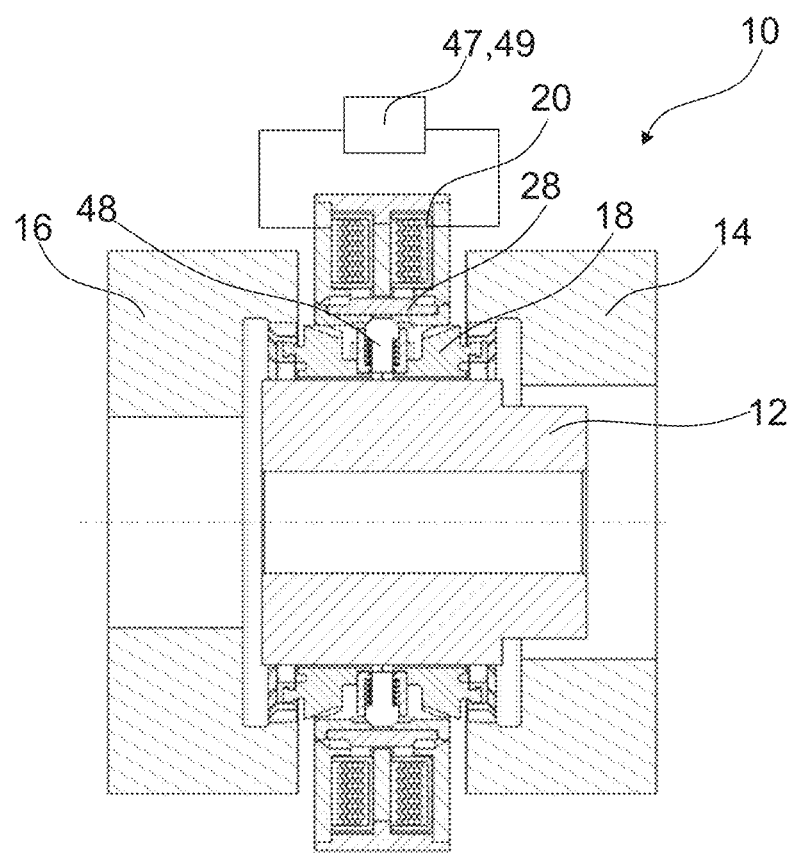
FIG. 26 shows a longitudinal section through the clutch of FIG. 25 in a neutral position.
Figure 27:
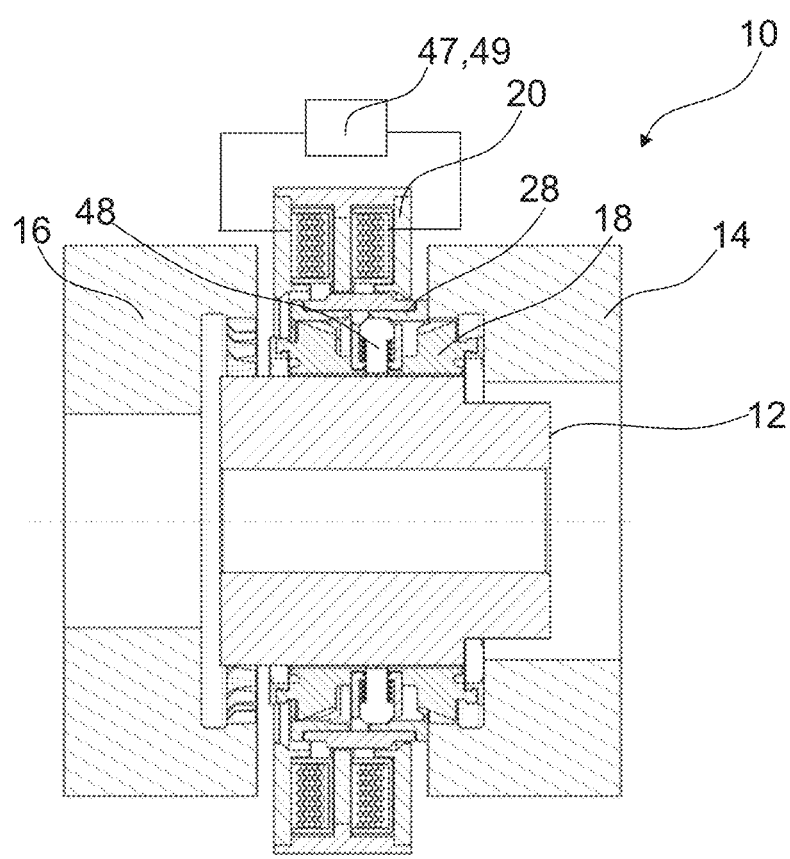
FIG. 27 shows a longitudinal section through the clutch of FIG. 25 in an engaged state.

FIGS. 25 to 27 show a further embodiment of the electromagnetic clutch 10.

The embodiment shown in FIGS. 25 to 27 is based on the embodiment illustrated in FIGS. 12 to 24.

However, in accordance with the embodiment shown in FIGS. 25 to 27, the locking element 48 has no locking function, but only a coupling function. The locking element 48 may couple the armature 28 to the shifting sleeve 18 as described above.

The locking tooth 70 and the tip 73 on the locking element 48 are omitted. Instead, the locking means 47 includes a control unit 49 which regulates the energization of the first coil and the second coil such that when the shifting sleeve is displaced from an engaged position in the direction of the disengaged position, movement of the shifting sleeve beyond the disengaged position in the direction of the further engaged position is prevented.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An electromagnetic clutch, comprising:
   a shifting sleeve which is arranged on a shaft for joint rotation therewith and is linearly displaceable along the shaft between a first engaged position, a second engaged position and a disengaged position located between the engaged positions,
   a first clutch body and a second clutch body, which are axially spaced apart from each other and are each aligned coaxially with the shaft, each clutch body having an internal toothing, and
   a stator having a first and a second energizable coil for direct or indirect adjustment of the shifting sleeve along the shaft,
   the shifting sleeve having a first toothing for engaging the internal toothing of the first clutch body in the first engaged position and a second toothing for engaging the internal toothing of the second clutch body in the second engaged position, and
   a locking device which prevents the shifting sleeve from moving beyond the disengaged position in the direction of the further engaged position when the shifting sleeve is displaced out of an engaged position in the direction of the disengaged position.

2. The electromagnetic clutch according to claim 1, wherein the locking device comprises a locking element which is a bolt which is radially displaceable between a release position and a locking position.

3. The electromagnetic clutch according to claim 2, wherein the locking element is acted upon into the release position by an elastic element.

4. The electromagnetic clutch according to claim 3, wherein the locking element is moved into the locking position against the spring force of the elastic element when the shifting sleeve moves from the disengaged position into an engaged position.

5. The electromagnetic clutch according to claim 2, wherein the locking element is mounted in the shifting sleeve so as to be radially displaceable.

6. The electromagnetic clutch according to claim 5, wherein the shifting sleeve is divided in the center and the two parts of the shifting sleeve are fastened axially to each other by a connecting ring, the locking element being guided in the connecting ring in a radially displaceable manner.

7. The electromagnetic clutch according to claim 1, wherein the clutch comprises an armature which is coupled to the shifting sleeve, the armature being displaceable along the first shaft by energizing the first or the second coil of the stator.

8. The electromagnetic clutch according to claim 7, wherein the locking device comprises a locking element which is a bolt which is radially displaceable between a release position and a locking position and wherein the armature is detachably coupled to the shifting sleeve in the direction of movement by device of the locking element.

9. The electromagnetic clutch according to claim 8, wherein the locking device comprises a locking element which is a bolt which is radially displaceable between a release position and a locking position and wherein a driving geometry for the positive coupling of the armature to the locking element is present on the armature, the driving geometry having a step or a bevel which is configured such that the locking element moves out of the release position into the locking position or vice versa by a movement along the step or the bevel when the shifting sleeve is displaced relative to the armature.

10. The electromagnetic clutch according to claim 7, wherein the armature is coupled to the shifting sleeve via two elastic spring elements which rest against opposite axial surfaces of the armature and each rest against the shifting sleeve with an end facing away from the armature.

11. The electromagnetic clutch according to claim 1, wherein the locking device comprises a locking element which is a bolt which is radially displaceable between a release position and a locking position and wherein a guiding surface is present on the outer side of the first shaft, a locking tooth being arranged centrally on the guiding surface, against which the locking element abuts when moving out of the engaged position into the disengaged position.

12. The electromagnetic clutch according to claim 1, wherein the clutch comprises a holding device which is set up to hold the shifting sleeve in the disengaged position or in the engaged position in the de-energized state of the coils.

13. The electromagnetic clutch according to claim 12, wherein the holding device has at least one holding element which is mounted in the shaft and elastically acted upon against the shifting sleeve, and wherein the shifting sleeve has three axially spaced recesses in the area of the holding element, the holding element projecting at least in sections into a corresponding recess in an engaged position or the disengaged position of the shifting sleeve.

14. The electromagnetic clutch according to claim 13, wherein at least one of the recesses has a triangular contour when viewed in a longitudinal section through the shifting sleeve.

15. The electromagnetic clutch according to claim 1, wherein the locking device comprises a control unit which is set up to regulate an energization of the first coil and the second coil such that when the shifting sleeve is displaced from an engaged position in the direction of the disengaged position, a movement of the shifting sleeve beyond the disengaged position in the direction of the further engaged position is prevented.

16. A method of actuating an electromagnetic clutch of claim 1, the method comprising:
while the shifting sleeve is in a disengaged position, the first or the second coil is energized, causing the shifting sleeve to be moved in the direction of the corresponding engaged position,
during the movement of the shifting sleeve from the disengaged position into an engaged position, in particular at the latest when the engaged position is reached, the locking element is moved in the radial direction out of a release position into a locking position, and
during a subsequent movement of the shifting sleeve out of the engaged position in the direction of the disengaged position by energizing the further coil, the locking element blocks a movement of the shifting sleeve into the disengaged position.

17. The method according to claim 16, wherein the locking element is moved into a release position by a re-energization of the first or second coil energized to move the shifting sleeve into the engaged position, allowing the shifting sleeve to return into the disengaged position.

18. The method according to claim 16, wherein after energization of the further coil the energization is stopped, causing the armature to move back into its initial position, the locking element being able to move back into the release position.

19. The method according to claim 16, wherein in an electromagnetic clutch comprising
a shifting sleeve which is arranged on a shaft for joint rotation therewith and is linearly displaceable along the shaft between a first engaged position, a second engaged position and a disengaged position located between the engaged positions,
a first clutch body and a second clutch body, which are axially spaced apart from each other and are each aligned coaxially with the shaft, each clutch body having an internal toothing,
a stator having a first and a second energizable coil for direct or indirect adjustment of the shifting sleeve along the shaft,
the shifting sleeve having a first toothing for engaging the internal toothing of the first clutch body in the first engaged position and a second toothing for engaging the internal toothing of the second clutch body in the second engaged position, and
a locking device which prevents the shifting sleeve from moving beyond the disengaged position in the direction of the further engaged position when the shifting sleeve is displaced out of an engaged position in the direction of the disengaged position,
the locking device comprising a locking element which is a bolt which is radially displaceable between a release position and a locking position and wherein a guiding surface is present on the outer side of the first shaft, a locking tooth being arranged centrally on the guiding surface, against which the locking element abuts when moving out of the engaged position into the disengaged position, and
wherein the shifting sleeve is reset to the disengaged position by the holding device, in particular by the holding element pressing against an inclined surface of the recess, which is triangular in a longitudinal section, of the shifting sleeve when it is acted upon.

20. The method of actuating an electromagnetic clutch comprising
a shifting sleeve which is arranged on a shaft for joint rotation therewith and is linearly displaceable along the shaft between a first engaged position, a second engaged position and a disengaged position located between the engaged positions,
a first clutch body and a second clutch body, which are axially spaced apart from each other and are each aligned coaxially with the shaft, each clutch body having an internal toothing, and
a stator having a first and a second energizable coil for direct or indirect adjustment of the shifting sleeve along the shaft,
the shifting sleeve having a first toothing for engaging the internal toothing of the first clutch body in the first engaged position and a second toothing for engaging the internal toothing of the second clutch body in the second engaged position, and
a locking device which prevents the shifting sleeve from moving beyond the disengaged position in the direction of the further engaged position when the shifting sleeve is displaced out of an engaged position in the direction of the disengaged position,
the locking device comprising a control unit which is set up to regulate an energization of the first coil and the second coil such that when the shifting sleeve is displaced from an engaged position in the direction of the disengaged position, a movement of the shifting sleeve beyond the disengaged position in the direction of the further engaged position is prevented, the method comprising:
- while the shifting sleeve is in a disengaged position, the first or the second coil is energized, causing the shifting sleeve to be moved in the direction of the corresponding engaged position, and
- during a subsequent movement of the shifting sleeve out of the engaged position in the direction of the disengaged position, the control unit regulates an energization of the first coil and the second coil such that when the shifting sleeve is displaced from an engaged position in the direction of the disengaged position, a movement of the shifting sleeve beyond the disengaged position in the direction of the further engaged position is prevented.

* * * * *